(12) United States Patent
Kawakatsu et al.

(10) Patent No.: US 8,151,368 B2
(45) Date of Patent: Apr. 3, 2012

(54) DYNAMIC MODE AFM APPARATUS

(75) Inventors: Hideki Kawakatsu, Tokyo (JP); Dai Kobayashi, Tokyo (JP)

(73) Assignee: Japan Science and Technology Agency (JP)

( * ) Notice: Subject to any disclaimer, the term of this patent is extended or adjusted under 35 U.S.C. 154(b) by 0 days.

(21) Appl. No.: 12/990,070

(22) PCT Filed: Apr. 8, 2009

(86) PCT No.: PCT/JP2009/057158
§ 371 (c)(1),
(2), (4) Date: Nov. 5, 2010

(87) PCT Pub. No.: WO2009/139238
PCT Pub. Date: Nov. 19, 2009

(65) Prior Publication Data
US 2011/0055983 A1    Mar. 3, 2011

(30) Foreign Application Priority Data
May 12, 2008 (JP) .................................. 2008-124891

(51) Int. Cl.
*G01B 5/28* (2006.01)
(52) U.S. Cl. ............................................. 850/5; 580/37
(58) Field of Classification Search ................ 850/5, 33, 850/37, 38
See application file for complete search history.

(56) References Cited

U.S. PATENT DOCUMENTS

| | | | |
|---|---|---|---|
| 5,266,896 A | * | 11/1993 | Rugar et al. .................. 324/307 |
| 6,079,254 A | | 6/2000 | Chen et al. |
| 6,234,009 B1 | | 5/2001 | Chen et al. |
| 7,707,873 B2 | * | 5/2010 | Degertekin .................... 73/105 |
| 2002/0089339 A1 | | 7/2002 | Murayama |
| 2009/0261249 A1 | | 10/2009 | Kobayashi et al. |
| 2010/0071099 A1 | | 3/2010 | Ota et al. |

OTHER PUBLICATIONS

Chemical identification of individual surface atoms by atomic force microscopy; Yoshiaki Sugimoto, Pablo Pou, Masayuki Abe, Pavel Jelinek, Ruben Perez, Seizo Morita and Oscar Custance; Mar. 2007, vol. 446, pp. 64-67; 2007 Nature Publishing Group.

* cited by examiner

Primary Examiner — Kiet T Nguyen
(74) Attorney, Agent, or Firm — Bacon and Thomas, PLLC

(57) ABSTRACT

A dynamic mode AFM apparatus for allowing high-speed identification of atoms of a sample surface, which comprises a scanner for performing three-dimensional scanning; an AC signal of a resonance frequency in a mode with flexural vibration of a cantilever; an AC signal of a second frequency which is lower than the frequency of the flexural vibration; a probe-sample distance modulated with the second frequency; a detector for detecting fluctuation of the resonance frequency; a detector for detecting vibration of the cantilever; and a detector for detecting a fluctuation component which is contained in a detected signal by detecting the resonance frequency fluctuation and synchronized with a modulation signal of the probe-sample distance, wherein an inclination of the resonance frequency against the probe-sample distance is obtained from the strength and polarity of the fluctuation component.

16 Claims, 10 Drawing Sheets

DYNAMIC MODE AFM APPARATUS

BACKGROUND OF THE INVENTION

1. Field of the Invention

The present invention relates to a dynamic mode AFM apparatus.

2. Description of the Related Art

Firstly, an AFM (atomic force microscopy) will be described.

A contact mode AFM is a technique to image a "constant force surface" of a sample surface by detecting force (usually, repulsive force), which is exerted between a probe and a sample when a cantilever with the probe attached thereto is brought close to the sample surface, based on flexure of the cantilever, and by two-dimensionally scanning the sample with the probe while controlling a probe-sample distance so that the detected force is kept constant. This contact mode AFM gives substantial damage to the sample due to the strong force exerted between the probe and the sample, and the atomic resolution is difficult to achieve.

In contrast, a dynamic mode AFM is a technique to image a "constant force gradient surface" of the sample surface by bringing a cantilever with a probe attached thereto close to a sample surface, detecting change in a resonance frequency of the cantilever due to a differential (force gradient) of force exerted between the probe and the sample with respect to a probe-sample distance, and two-dimensionally scanning the sample with the probe while controlling the probe-sample distance so that the change in the resonance frequency is kept constant.

FIG. 1 shows an exemplary configuration in the area of a sample and cantilever of a conventional dynamic mode AFM apparatus.

In FIG. 1, reference numeral 201 denotes a sample, 202A denotes a probe of a cantilever 202, 202B denotes a base of the cantilever 202, 203 denotes an XYZ scanner, 204 denotes a cantilever excitation means, 205 denotes an optical position detector (detector with an optical lever) to detect the position of the cantilever 202 by irradiating a bottom face of the cantilever 202 with a laser beam 206, and 207 denotes a state of flexural vibration of the cantilever.

FIG. 1 shows X, Y, and Z directions because the XYZ coordinate will be used in the following description. Although the sample 201 is mounted on the XYZ scanner 203 in this example, there are other variations in which the cantilever 202 is attached to the XYZ scanner 203, or the sample 201 is attached to an XY scanner and the cantilever 202 is attached to a Z scanner. Moreover, although the figure illustrates the cantilever excitation means 204 similar to a piezoelectric element, it is also possible to utilize photothermal excitation or electromagnetic field. Furthermore, although the optical position detector 205 is used to detect the flexure of the cantilever 202 with the optical lever, it is also possible to apply speed detection by a laser Doppler vibrometer or displacement detection by an optical fiber interferometer.

FIG. 2 shows an exemplary relationship between the probe-sample distance and a force and force gradient acting on the cantilever, and FIG. 3 shows an exemplary relationship between the probe-sample distance and the resonance frequency of the cantilever. The reason why the resonance frequency of the cantilever varies due to the force gradient is that the force which varies dependent on the distance is equivalent to a spring and thus the force acted by the equivalent spring is added to that of a spring inherently provided for the cantilever. However, the equivalent spring will have a negative spring constant when the polarity of the force gradient is positive. When the negative spring constant is applied, the resonance frequency will decrease.

Methods to detect the change in the resonance frequency include: (1) a method in which the cantilever itself is used as a mechanical resonator to configure a self-excited oscillation circuit to detect the change in the oscillating frequency; and (2) a method in which the cantilever is forced to vibrate at a constant frequency near the resonance frequency to detect the change in the resonance frequency from a phase difference between a signal used for the vibration and the detected vibration. Assuming that the above methods (1) and (2) are referred to as the FM (frequency modulation) method and the PM (phase modulation) method, respectively, there is a third method (3) in which, while the forced vibration is used, the frequency for the forced vibration is controlled to follow the resonance frequency by utilizing the detected phase difference. Here, this method is referred to as the tracking separate-excited method.

Since any method above can detect information on a frequency axis with high sensitivity by narrowing a bandwidth to be observed, the dynamic mode AFM allows observation in a region where the probe-sample force is weak as compared to the contact mode AFM, resulting in less damage to the sample and thus the atomic resolution can be obtained more easily.

As described above, the dynamic mode AFM traces the "constant force gradient surface". The "constant force gradient surface" is generally considered to approximate a "constant height surface". Since the force gradient graph of FIG. 2 varies dependent on atomic species, however, the "constant force gradient surface" would be identical to the true "constant height surface" only in the case where the force gradient graph of FIG. 2 does not change while the sample consists of single-element atoms and the probe tip is placed right above an atom or between atoms. Therefore, for the sample consisting of atoms of plural elements, the "constant force gradient surface" is not identical to the true "constant height surface", and the observed atomic species cannot be estimated unless some information on constituent elements or crystal structures of the sample has been preliminarily provided.

Meanwhile, the literature has been published that describes the position of the minimum point (point B where the resonance frequency decreases most, i.e., the point where the force gradient of FIG. 2 is maximum) in the graph of FIG. 3 is characteristic of the atomic species, and thus the atomic species can be determined by obtaining the minimum point position (see Non-Patent Document 1 below).

According to this method, it is possible to color a topographic image (three-dimensional graphic representation of the "constant force gradient surface") of the sample observed by the conventional dynamic mode AFM based on the atomic species obtained from the minimum point position, so as to display the image as if each atomic species is differently colored.

Non-Patent Document 1: Yoshiaki Sugimoto et al., "Chemical identification of individual surface atoms by atomic force microscopy", Nature, Vol. 446, 2007, pp. 64-67

SUMMARY OF THE INVENTION

However, according to the method of the above Non-Patent Document 1, there has been the need to position the probe without drift on the atom of the sample and equalize force curves for several hundred times. That is, it is required to acquire the graph of FIG. 3 for each atomic species, obtain manually the minimum point position thereof, and decide the color thereof. This process is much time-consuming as compared to the real-time image pick-up as in the conventional dynamic AFM or the like.

In view of the circumstances described above, the present invention is directed to provide a dynamic mode AFM apparatus that configures an automatic control system which can automatically obtain the probe-sample distance, and allows high-speed identification of atoms of the sample surface.

In order to achieve the object described above, the present invention provides the following:

[1] A dynamic mode AFM apparatus comprising: a scanner for performing three-dimensional relative scanning of a cantilever and a sample; a means for generating an AC signal of a resonance frequency in a mode with flexural vibration of the cantilever; a means for exciting the flexural vibration of the cantilever with the resonance frequency; a means for generating an AC signal of a second frequency which is lower than the frequency of the flexural vibration; a means for modulating a probe-sample distance of the cantilever with the second frequency; a means for detecting fluctuation of the resonance frequency; a means for detecting vibration of the cantilever; and a means for detecting a fluctuation component which is contained in a detected signal by the means for detecting the resonance frequency fluctuation and synchronized with a modulation signal of the probe-sample distance, wherein an inclination of the resonance frequency against the probe-sample distance is obtained from strength and polarity of the fluctuation component.

[2] The dynamic mode AFM apparatus according to [1], wherein the probe-sample distance is automatically controlled so that the inclination of the resonance frequency against the probe-sample distance becomes zero.

[3] The dynamic mode AFM apparatus according to [1] or [2], wherein a frequency in a mode with flexural vibration of a lower order is used as the second frequency, that is different from the frequency in the mode with flexural vibration.

[4] The dynamic mode AFM apparatus according to [1], [2], or [3], wherein a self-excited oscillation circuit which oscillates at the resonance frequency in the mode is configured as the means for generating the AC signal of the resonance frequency in the mode with flexural vibration of the cantilever, and frequency detection is used as the means for detecting the fluctuation of the resonance frequency.

[5] The dynamic mode AFM apparatus according to [1], [2], or [3], wherein a self-excited oscillation circuit which oscillates at the resonance frequency in the mode is configured as the means for generating the AC signal of the resonance frequency in the mode with flexural vibration of the cantilever, and phase detection is used as the means for detecting the fluctuation of the resonance frequency.

[6] The dynamic mode AFM apparatus according to [1], [2], or [3], wherein a signal source to generate an AC signal of a frequency that is a constant frequency around the resonance frequency of the mode or that is controlled to slowly follow the resonance frequency of the mode is used as the means for generating the AC signal of the resonance frequency in the mode with flexural vibration of the cantilever, and the means for detecting the fluctuation of the resonance frequency is configured by detecting a phase of displacement or speed of the cantilever against the signal.

DESCRIPTION OF THE PREFERRED
EMBODIMENTS

A dynamic mode AFM apparatus comprising: a scanner for performing three-dimensional relative scanning of a cantilever and a sample; a means for generating an AC signal of a resonance frequency in a mode with flexural vibration of the cantilever; a means for exciting the flexural vibration of the cantilever with the resonance frequency; a means for generating an AC signal of a second frequency which is lower than the frequency of the flexural vibration; a means for modulating a probe-sample distance of the cantilever with the second frequency; a means for detecting fluctuation of the resonance frequency; a means for detecting vibration of the cantilever; and a means for detecting a fluctuation component which is contained in a detected signal by the means for detecting the resonance frequency fluctuation and synchronized with a modulation signal of the probe-sample distance, wherein an inclination of the resonance frequency against the probe-sample distance is obtained from strength and polarity of the fluctuation component.

EMBODIMENTS

Hereinafter, the embodiments of the present invention will be described in detail.

Figure 4:
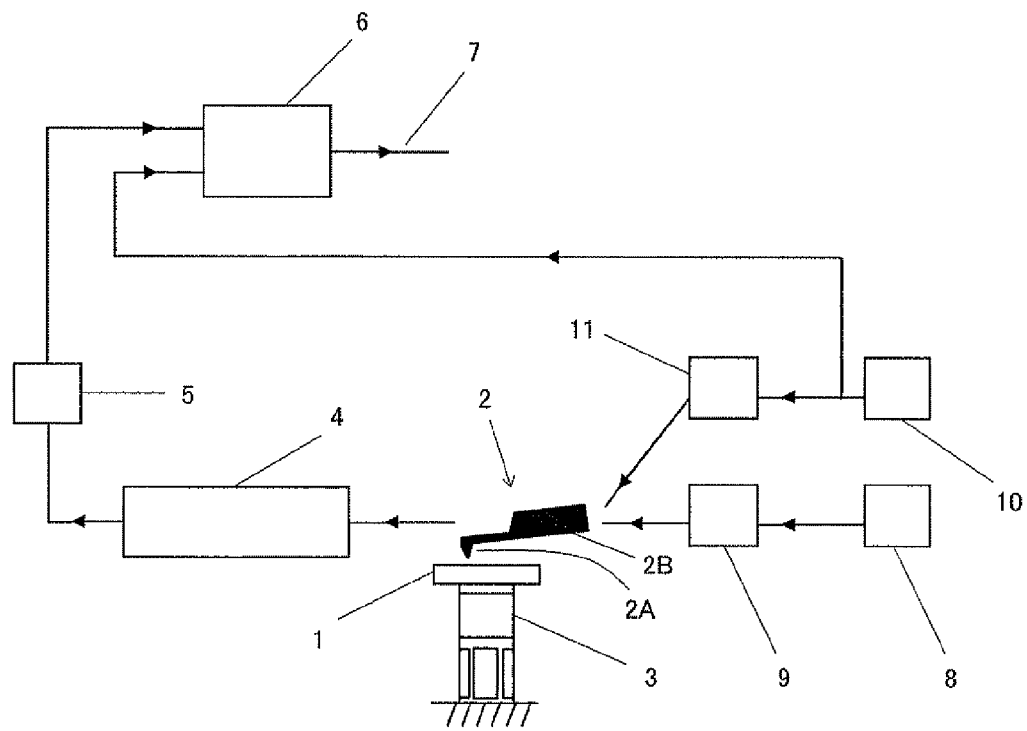
FIG. 4 is a block diagram of a basic dynamic mode AFM apparatus of the present invention.

FIG. 4 is a block diagram of a basic dynamic mode AFM apparatus of the present invention. In this figure, reference numeral 1 denotes a sample, 2 denotes a cantilever, 2A denotes a probe of the cantilever 2, 2B denotes a base of the cantilever 2, 3 denotes a scanner that can perform three-dimensional relative scanning of the cantilever 2 and the sample 1, and 4 denotes a vibration detector of the cantilever 2. The detector may be configured to detect speed or displacement instead of vibration, and may be replaced by an optical lever mechanism or laser Doppler meter. Reference numeral 5 denotes a means for detecting resonance frequency fluctuation, and 6 denotes a means for detecting a fluctuation component that is contained in a detected signal by the means 5 for detecting the resonance frequency fluctuation and synchronized with a modulation signal of a probe 2A-sample 1 distance of the cantilever 2. With the means 6, an inclination signal 7 of the resonance frequency against the probe 2A-sample 1 distance of the cantilever 2 can be obtained. Reference numeral 8 denotes a means for generating an AC signal of the resonance frequency in a mode with the flexural vibration of the cantilever 2, 9 denotes a means for exciting the flexural vibration of the cantilever 2 in response to the signal from the means 8, 10 denotes a means for generating an AC signal of a second frequency, and 11 denotes a means, connected to the means 10 for generating the AC signal of the second frequency, for modulating the probe 2A-sample 1 distance of the cantilever 2 with the second frequency. An output signal from the means 10 for generating the AC signal of the second frequency is ultimately input into the means 6 for detecting the fluctuation component synchronized with the modulation signal.

Here, in FIG. 4, a computer, a control circuit of the Z-axis of the scanner 3, and the like that are necessary for the dynamic mode AFM are omitted.

The means 8 for generating the AC signal of the resonance frequency in the mode with the flexural vibration of the cantilever 2 can include a signal source with a constant frequency, a signal source that slowly follows the resonance frequency of the cantilever 2, a self-excited oscillation circuit that uses the cantilever 2 as a mechanical oscillator, and the like.

The means 9 for exciting the flexural vibration of the cantilever 2 can include a piezoelectric actuator, photothermal excitation, magnetic excitation, electric field excitation, and the like.

The second frequency may include either a frequency irrelevant to the resonance frequency of the cantilever or a frequency in a mode with another flexural vibration lower than in the mode with the flexural vibration above.

The means 11 for modulating the probe-sample distance with the second frequency may include the scanner 3, the means 9 for exciting the flexural vibration of the cantilever 2, and a means specific to the second frequency (piezoelectric actuator, photothermal excitation, magnetic excitation, electric field excitation, and the like).

Although the means 5 for detecting the resonance frequency fluctuation includes FM detection, PM detection, and the like, such means may not be realized depending on a combination with the means 8 for generating the AC signal of the resonance frequency in the mode with the flexural vibration of the cantilever 2.

The means 6 for detecting the fluctuation component synchronized with the modulation signal includes a phase comparator configured by a multiplier, a low pass filter, a lock-in amplifier, a digital circuit, and the like. Such means may be configured by an analog circuit, or based on digital signal processing.

Hereinafter, the fundamental principles of the present invention will be described.

Figure 5:
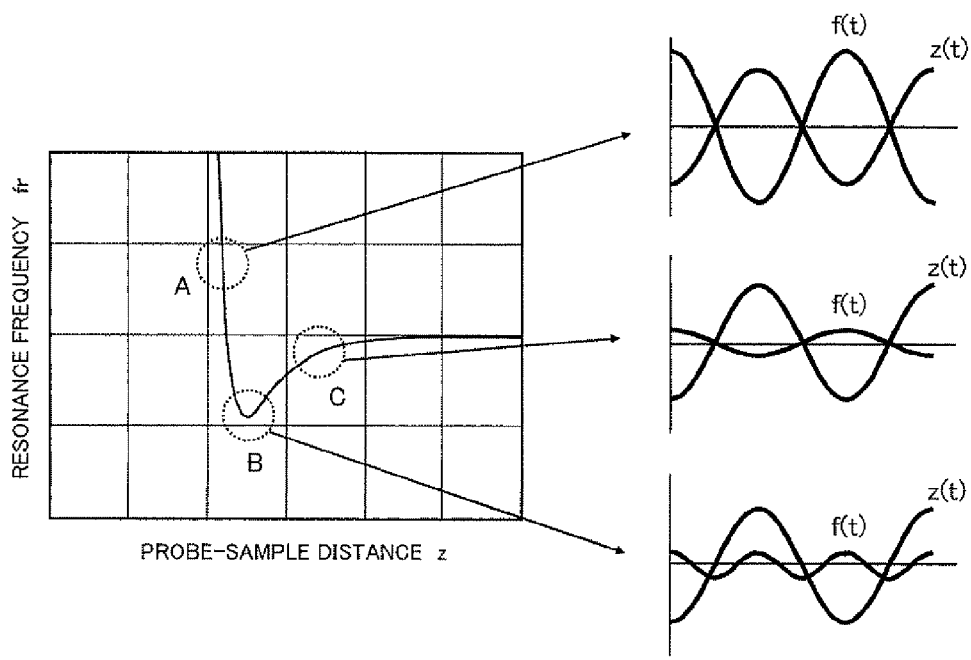
FIG. 5 is a waveform diagram of dither signals and resonance frequency changes wherein the inclination of the resonance frequency against the probe-sample distance is any of positive (C), negative (A), and zero (B), according to the dynamic mode AFM apparatus of the present invention.

FIG. 5 is a waveform diagram of dither signals z(t) and resonance frequency changes f(t) wherein the inclination of the resonance frequency against the probe-sample distance is any of positive (C), negative (A), and zero (B), according to the dynamic mode AFM apparatus of the present invention.

By using the FM method, the PM method, the tracking separate-excited method, or the like mentioned above in Description of the Related Art, the probe-sample distance is microscopically changed by, aside from the flexural vibration to recognize the resonance frequency of the cantilever, a dither signal with the much lower second frequency. The probe-sample distance will be simultaneously affected by both the change in the flexural vibration above and the change in the dither signal. The resonance frequency to be detected from the flexural vibration also varies along with the change in the probe-sample distance by the dither signal, and the inclination in the graph shown in FIG. 5 can be recognized from the polarity and amplitude of a frequency component identical to that of the dither signal which is involved in the change.

Here, the merit to recognize the inclination of the graph shown in FIG. 5 will be described.

Figure 1:
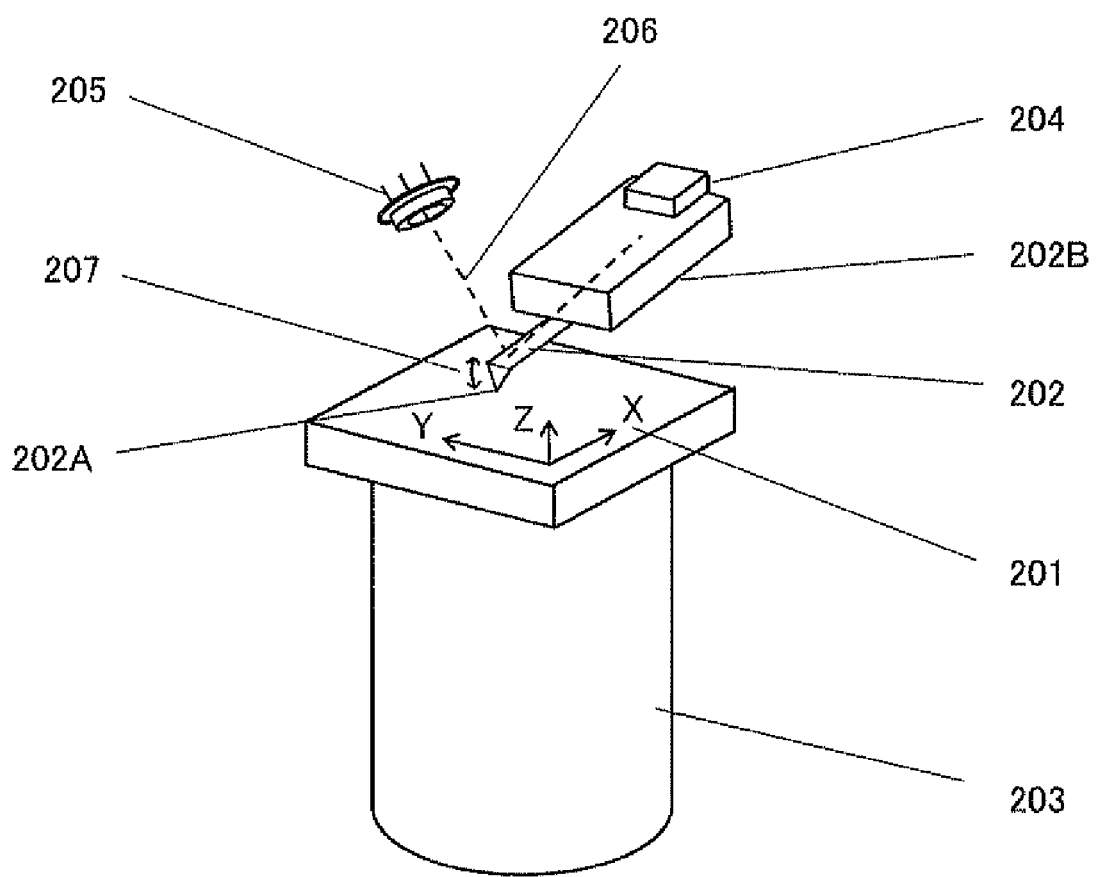
FIG. 1 shows an exemplary configuration in the area of a sample and cantilever of a conventional dynamic mode AFM apparatus.
Figure 2:
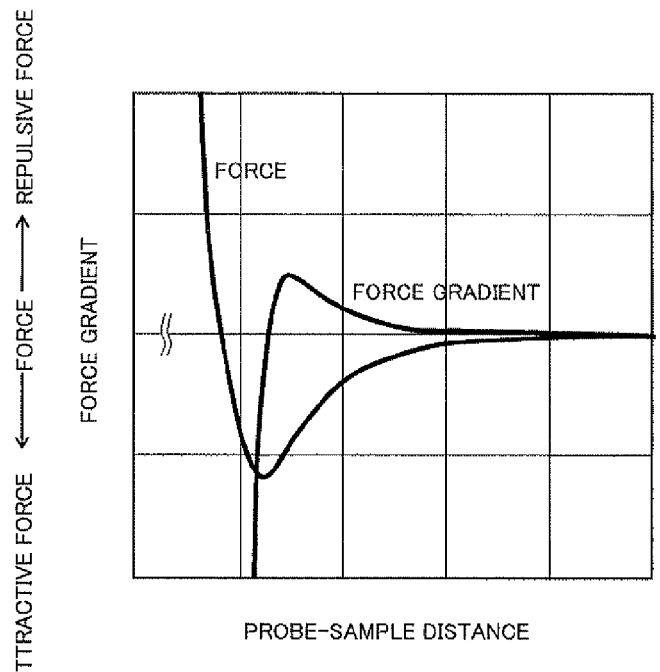
FIG. 2 shows an exemplary relationship between a probe-sample distance and a force and force gradient acting on a cantilever.
Figure 3:
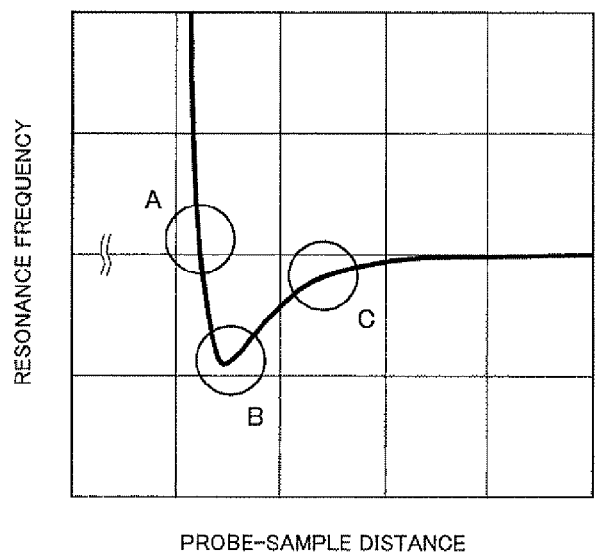
FIG. 3 shows an exemplary relationship between the probe-sample distance and a resonance frequency of the cantilever.

Since the control system of the conventional dynamic mode AFM apparatus is made so as to stabilize the inclination of the resonance frequency in either positive or negative, the polarity of the control could be reversed in a region near the minimum point and thus such a system cannot be used. On the other hand, for the sample immersed in water or exposed to steam of water or solvent, the water or solvent is layered on the sample surface, so that the force gradient may become alternatively positive and negative instead of being simple as shown in FIG. 2. In such a case, if it is desired to observe a region of second positive inclination from the sample, for example, the conventional dynamic mode AFM cannot provide a means for reliably reaching the region. Accordingly, the method according to the present invention is used to detect the inclination and change the polarity of the control system so as to stabilize the control regardless of the inclination being positive or negative, thereby the above-described problems that have been conventionally difficult to solve can be solved.

The inclination of the resonance frequency against the probe-sample distance can be output in real-time by multiplying the dither signal and the signal output from the means for detecting the resonance frequency (z(t) and f(t) waveforms in FIG. 5), and passing it through a low pass filter.

Furthermore, since a resulting image through XY scanning while controlling the Z-axis of the XYZ scanner 3 so that the obtained signal indicating the inclination is always kept zero represents a "minimum resonance frequency surface", the atomic species can be identified from the depth thereof. According to this method, the AFM apparatus can be realized which can identify the atomic species with substantially high speed even though it may be slower than the conventional dynamic mode AFM.

Hereinafter, such a dynamic mode AFM apparatus will be described.

Figure 6:
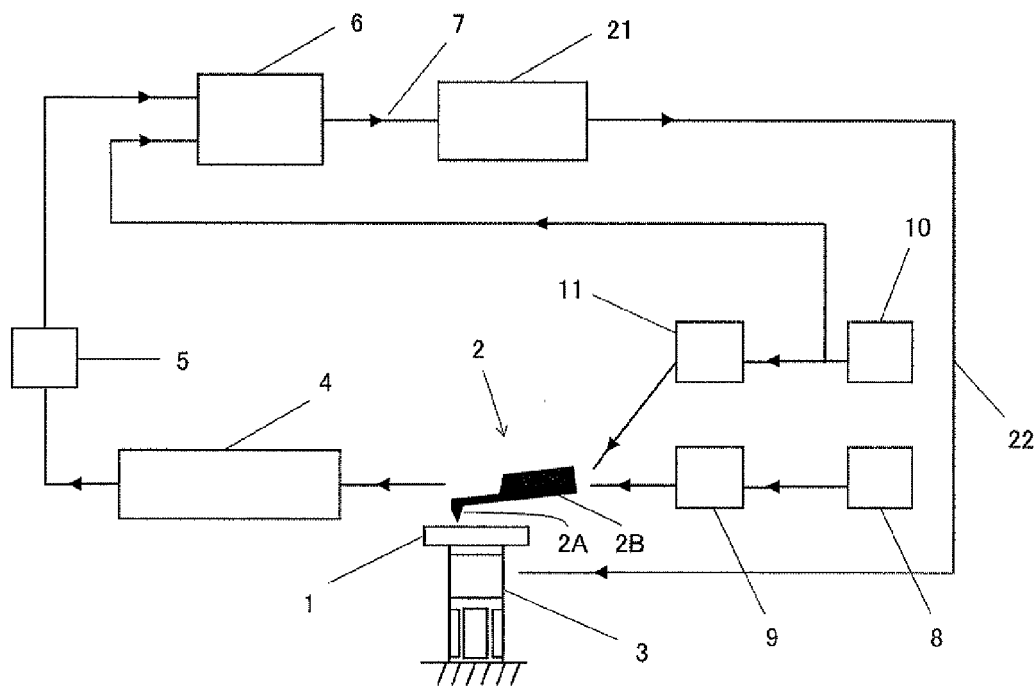
FIG. 6 is a block diagram of the dynamic mode AFM apparatus illustrating a first embodiment of the present invention.

FIG. 6 is a block diagram of the dynamic mode AFM apparatus illustrating a first embodiment of the present invention.

In this first embodiment, a controller 21 is added to the means 6 for detecting the fluctuation component synchronized with the modulation signal of the system shown in FIG. 4. The controller 21 outputs a Z-axis control signal 22 to control the Z-axis of the scanner 3 that can perform three-dimensional relative scanning of the cantilever 2 and the sample 1 so that the inclination of the resonance frequency against the probe-sample distance becomes zero. In FIG. 6, a computer that is necessary for the dynamic mode AFM apparatus is also omitted.

Figure 7:
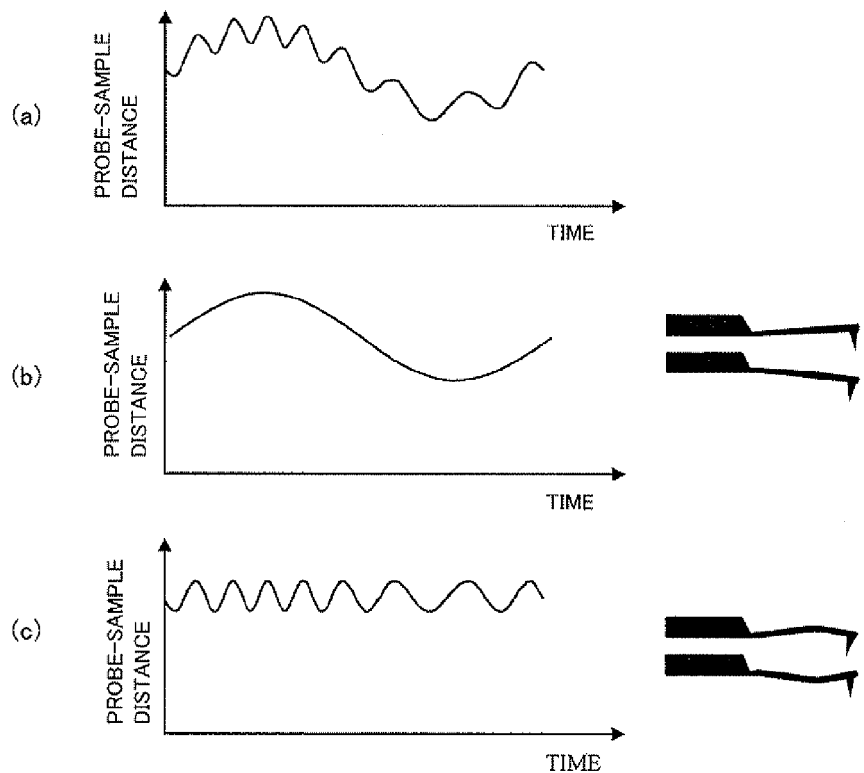
FIG. 7 shows a temporal change of the probe-sample distance in the dynamic mode AFM apparatus of the present invention.

FIG. 7 shows a temporal change of the probe-sample distance in the dynamic mode AFM apparatus of the present invention.

Here, the temporal change of the probe-sample distance is shown in the case where a frequency of a secondary flexural vibration mode is used as the frequency in the mode with the flexural vibration, and a frequency of a primary flexural vibration mode is used as the second frequency. The example is at least shown where the secondary vibration is generated by self-excited vibration.

FIG. 7(a) shows a temporal change of the probe-sample distance when the cantilever is excited with the frequencies of the primary and secondary flexural vibration modes simultaneously, FIG. 7(b) shows a component of the primary flexural vibration mode and a shape of the primary flexural mode, and FIG. 7(c) shows a component of the secondary flexural vibration mode and a shape of the secondary flexural mode.

In this figure, a vibration frequency of the secondary vibration mode in FIG. 7(c) is temporally changed because the distance is modulated by the component of the primary vibration mode shown in FIG. 7(b).

Figure 8:
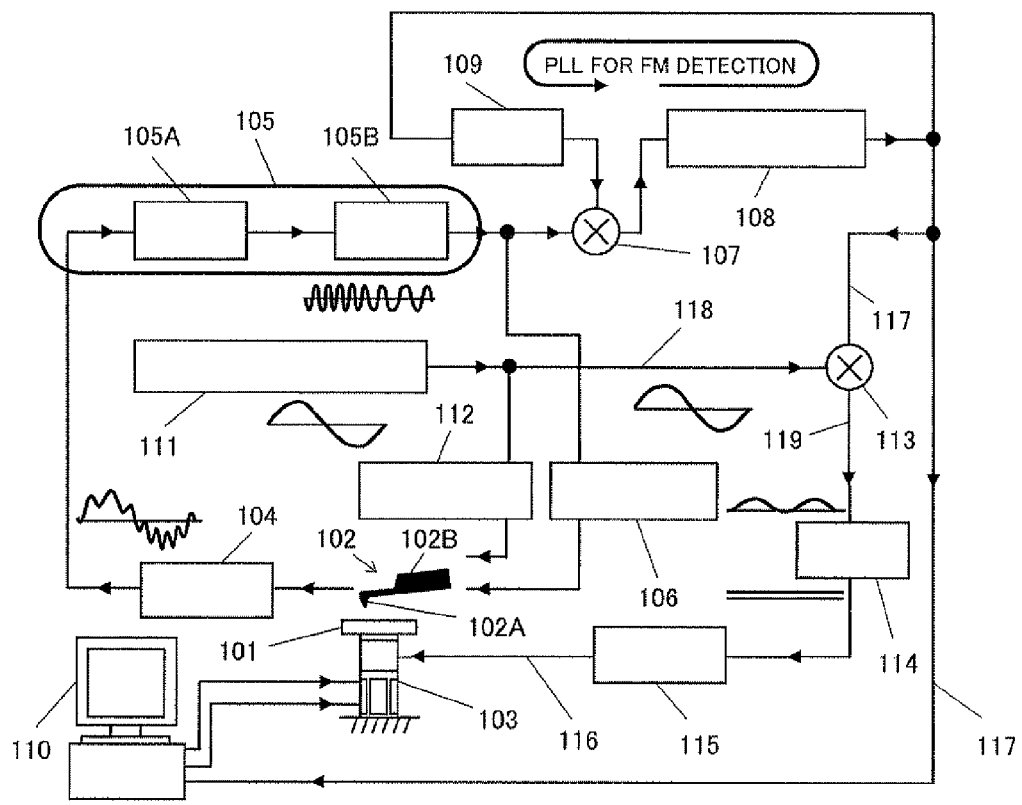
FIG. 8 is a block diagram of the dynamic mode AFM apparatus illustrating a second embodiment of the present invention.
Figure 9:
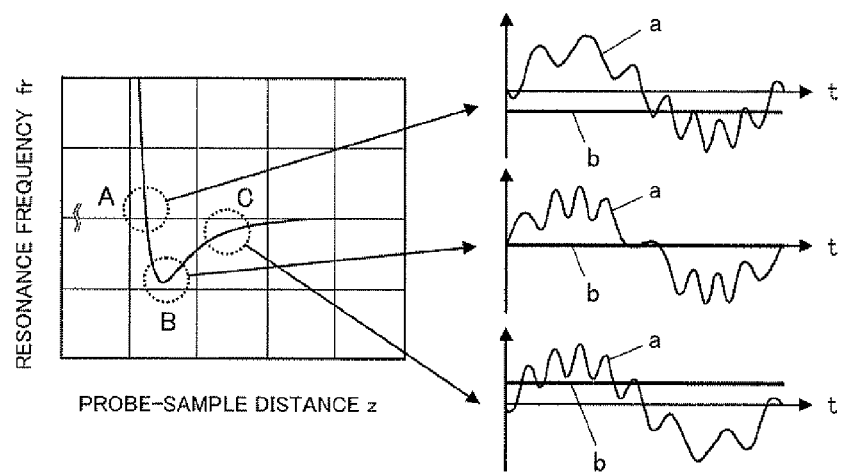
FIG. 9 is a waveform diagram of vibration waveforms and resonance frequency inclinations wherein the inclination of the resonance frequency against the probe-sample distance is any of positive (C), negative (A), and zero (B), according to the dynamic mode AFM apparatus of the present invention.

FIG. 8 is a block diagram of the dynamic mode AFM apparatus illustrating a second embodiment of the present invention, and FIG. 9 is a waveform diagram of vibration waveforms and resonance frequency inclinations wherein the inclination of the resonance frequency against the probe-sample distance is any of positive (C), negative (A), and zero (B), according to the dynamic mode AFM apparatus of the present invention.

In FIG. 8, reference numeral 101 denotes a sample, 102 denotes a cantilever, 102A denotes a probe of the cantilever 102, 102B denotes a base of the cantilever 102, 103 denotes a scanner that can perform three-dimensional relative scanning of the cantilever 102 and the sample 101, and 104 denotes a vibration detector of the cantilever 102. The detector may be configured to detect speed or displacement instead of vibration, and may be replaced by an optical lever mechanism or a laser Doppler meter. Reference numeral 105 denotes a self-excited oscillation circuit for generating an AC signal of the resonance frequency in the mode with flexural vibration of the cantilever 102, wherein the self-excited oscillation circuit 105 is configured by a BPF (band pass filter) 105A and a wave shaping circuit 105B. This self-excited oscillation circuit 105 is connected to a means 106 for exciting the flexural vibration of the cantilever 102, and the output from the means 106 for exciting the flexural vibration of the cantilever 102 is supplied to the cantilever 102. This self-excited oscillation circuit 105 is also connected to a first phase comparator 107. This first phase comparator 107 is connected to a loop filter 108, and the output from the loop filter 108 is input into the first phase comparator 107 through a VCO (voltage-controlled oscillator) 109. That is, these function as a PLL for FM detection. Reference numeral 110 denotes an XY scanning signal generator.

In addition, a second frequency generation means 111 is provided, wherein the output signal from the second frequency generation means 111 is input into a means 112 for modulating a probe 102A-sample 101 distance of the cantilever 102 with the second frequency, and the output from the means 112 for modulating the probe 102A-sample 101 distance of the cantilever 102 with the second frequency is supplied to the cantilever 102.

Furthermore, the output signal from the second frequency generation means 111 is input into a second phase comparator 113 along with the output signal from the loop filter 108, so that the phase difference is detected. The output signal from the second phase comparator 113 is input into a LPF (low pass filter) 114. The output signal from the LPF 114 is input into a controller 115, and the output signal from the controller 115 serves as a Z-axis control signal 116 to control the Z-axis of the scanner 103. In FIG. 8, reference numeral 117 denotes output from the loop filter 108, 118 denotes a second frequency component, and 119 denotes output from the second phase comparator 113.

Here, the exemplary output signals at three points A, B, and C of the resonance frequency (fr) against the probe-sample distance (z) are as shown in FIG. 9. In this figure, the line a denotes a vibration waveform as the output signal from the vibration detector 104, and the line b denotes a "signal indicating the inclination of the resonance frequency against the probe-sample distance" as the output from the LPF 114.

The controller 115 controls the Z-axis of the scanner 103 to adjust the probe-sample distance in order to achieve the condition as B in FIG. 9. Therefore, in the condition where the control by the controller 115 is valid, the output 117 from the loop filter 108 exhibits the minimum value of the resonance frequency. The XY scanning signal generator 110 provides the XY axis of the scanner 103 with the scanning signal, and the output value of the loop filter 108 at each XY coordinate is recorded and imaged, so that an image of XY distribution of the minimum resonance frequency is displayed. The resulting image represents the distribution of atomic species as described in the Non-Patent Document 1 above.

In a second embodiment, the frequency in the mode with flexural vibration of a lower order is used as the second frequency, that is different from the frequency in the mode with flexural vibration.

While the FM detection methods include various methods, such as delay detection, rectangular detection, and PLL, the example of PLL detection is illustrated herein. There is a control loop which maintains the minimum value of the resonance frequency with the Z-axis control by the Z-axis control signal 116 from the controller 115.

By configuring in this manner, utilization of the vibration mode of the cantilever 102 allows efficient vibration owing to the amplification effect of the amplitude.

Figure 10:
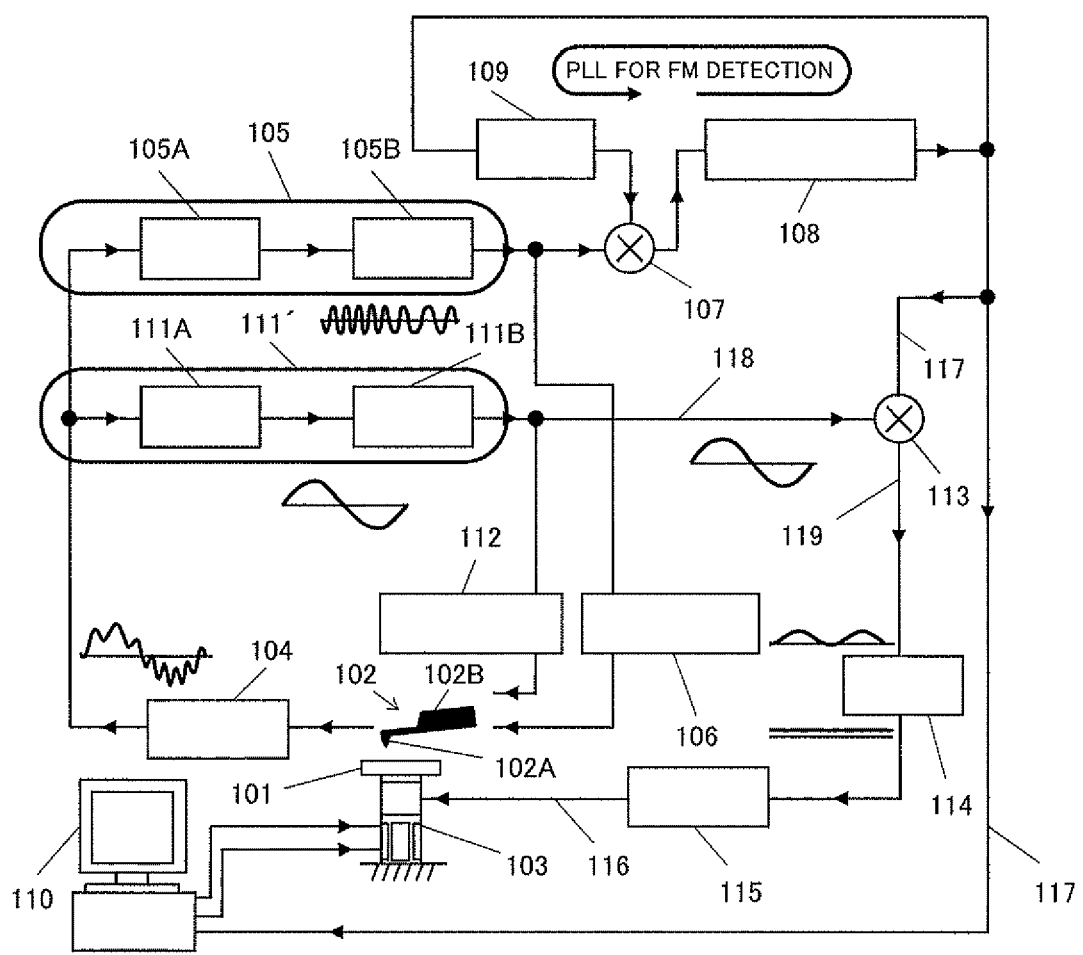
FIG. 10 is a block diagram of the dynamic mode AFM apparatus illustrating a third embodiment of the present invention.

FIG. 10 is a block diagram of the dynamic mode AFM apparatus illustrating a third embodiment of the present invention.

In this third embodiment, the second frequency generation means also uses a self-excited oscillation circuit 111' configured by a BPF 111A and a wave shaping circuit 111B. There are wide variations in consideration of combination with a principle of detecting circuit, and this is only one example.

Figure 11:
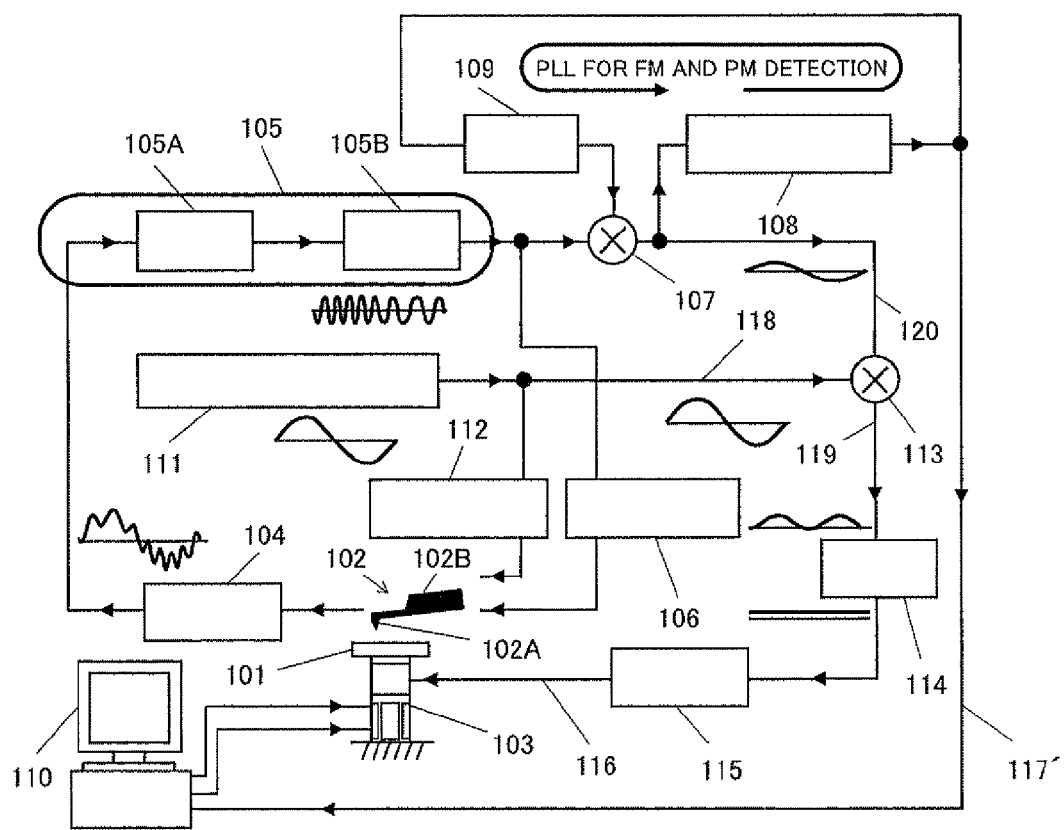
FIG. 11 is a block diagram of the dynamic mode AFM apparatus illustrating a fourth embodiment of the present invention.

FIG. 11 is a block diagram of the dynamic mode AFM apparatus illustrating a fourth embodiment of the present invention.

In this fourth embodiment, a PM detection output 120 as the output from the first phase comparator 107 is input into the second phase comparator 113.

This fourth embodiment is the example in which the PM detection by the PLL is used. Essentially, the FM signal is also the PM signal. Particularly, the PLL detection cannot be performed if the frequency of FM modulation is too high. In such a case, a PM detection signal contained in the output from the phase comparator 107 of the PLL can be used instead of the FM detection signal.

For example, if the frequency of the self-excited oscillation circuit 105 which generates the AC signal of the resonance frequency in the mode with flexural vibration of the cantilever is set to the secondary flexural mode frequency of the cantilever 102, and the frequency of the second frequency generation means 111 which generates the AC signal of the second frequency lower than that of the flexural vibration is set to the primary flexural mode frequency of the cantilever 102, the modulation frequency of the FM signal to be detected would be approximately between one-sixth and one-seventh of the carrier frequency, resulting in the difficulty of the FM detection by the PLL.

Here, a low-speed FM detection output 117' outputs a minimum point frequency of the resonance frequency.

Figure 12:
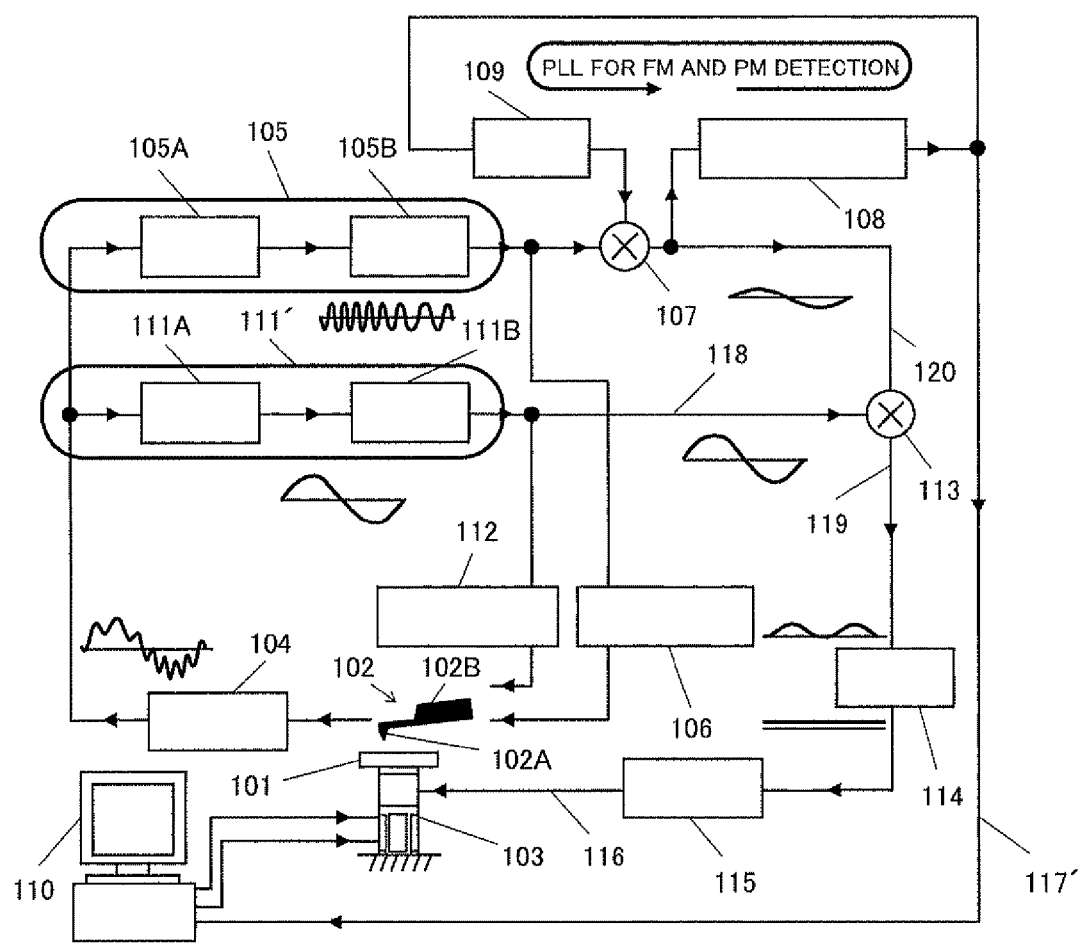
FIG. 12 is a block diagram of the dynamic mode AFM apparatus illustrating a fifth embodiment of the present invention.

FIG. 12 is a block diagram of the dynamic mode AFM apparatus illustrating a fifth embodiment of the present invention.

In this fifth embodiment, the "second frequency" from the second frequency generation means 111 in FIG. 11 is also generated by the self-excited oscillation circuit 111' configured by the BPF 111A and the wave shaping circuit 111B. This embodiment shows a specific configuration in the case where two modes of the cantilever 102 is utilized, as shown in the fourth embodiment.

Figure 13:
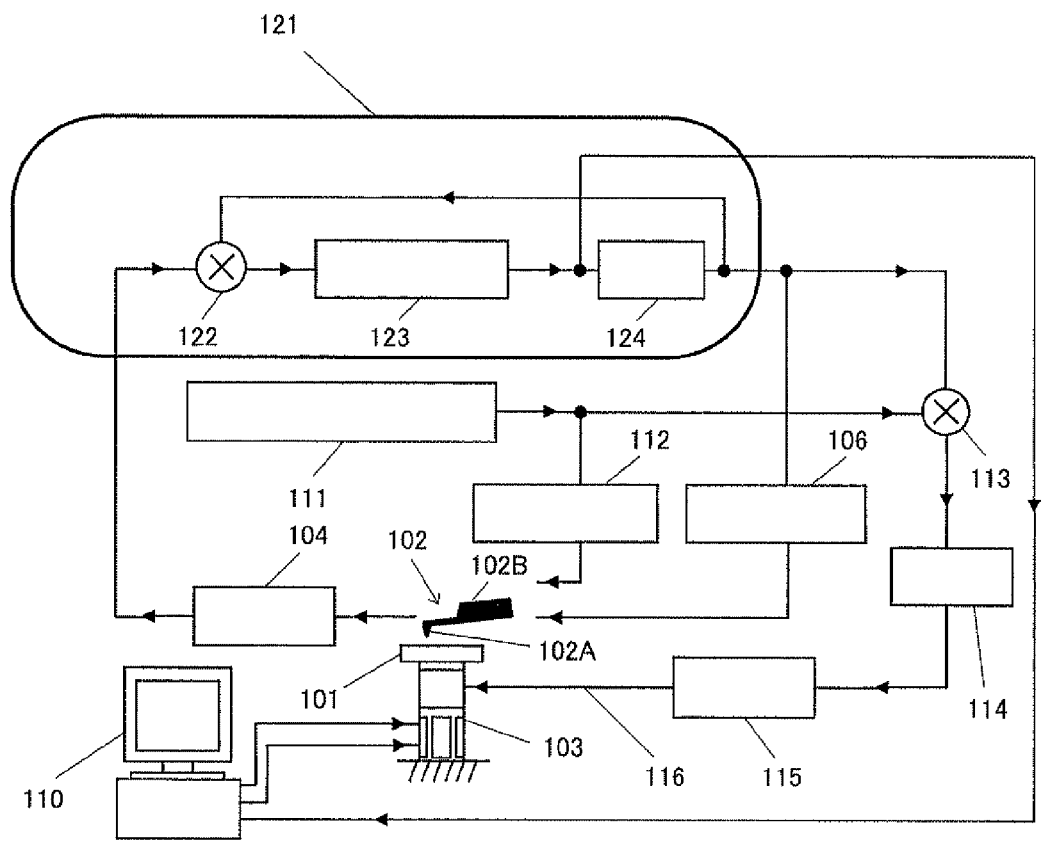
FIG. 13 is a block diagram of the dynamic mode AFM apparatus illustrating a sixth embodiment of the present invention.

FIG. 13 is a block diagram of the dynamic mode AFM apparatus illustrating a sixth embodiment of the present invention.

In this figure, the output from the vibration detector 104 of the cantilever 102 is controlled to slowly follow the resonance frequency at an AC signal source 121 configured by a third phase comparator 122, a loop filter 123, and a VCO 124. Here, "slowly" means at a low speed such that the output does not respond to the fluctuation of the resonance frequency caused by the modulation of a distance by the second frequency from the second frequency generation means 111.

While the Z-axis control is carried out in this sixth embodiment, the Z-axis control may be omitted as shown in FIG. 4.

Figure 14:
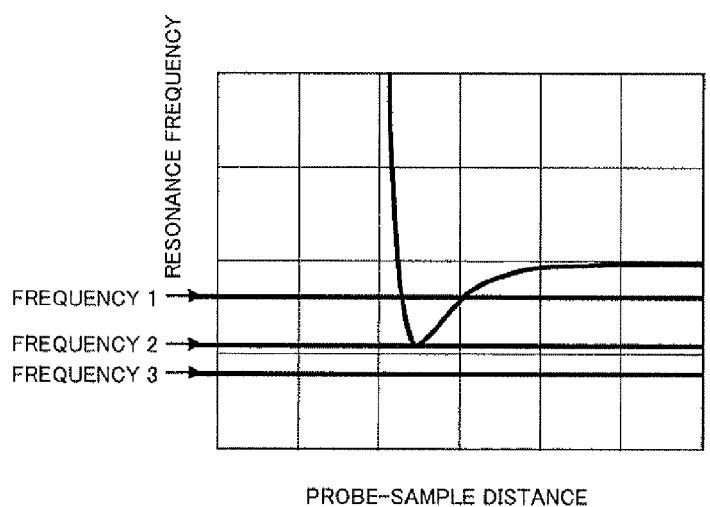
FIG. 14 shows a relationship between the probe-sample distance and the resonance frequency in the dynamic mode AFM apparatus of the present invention.
Figure 15:
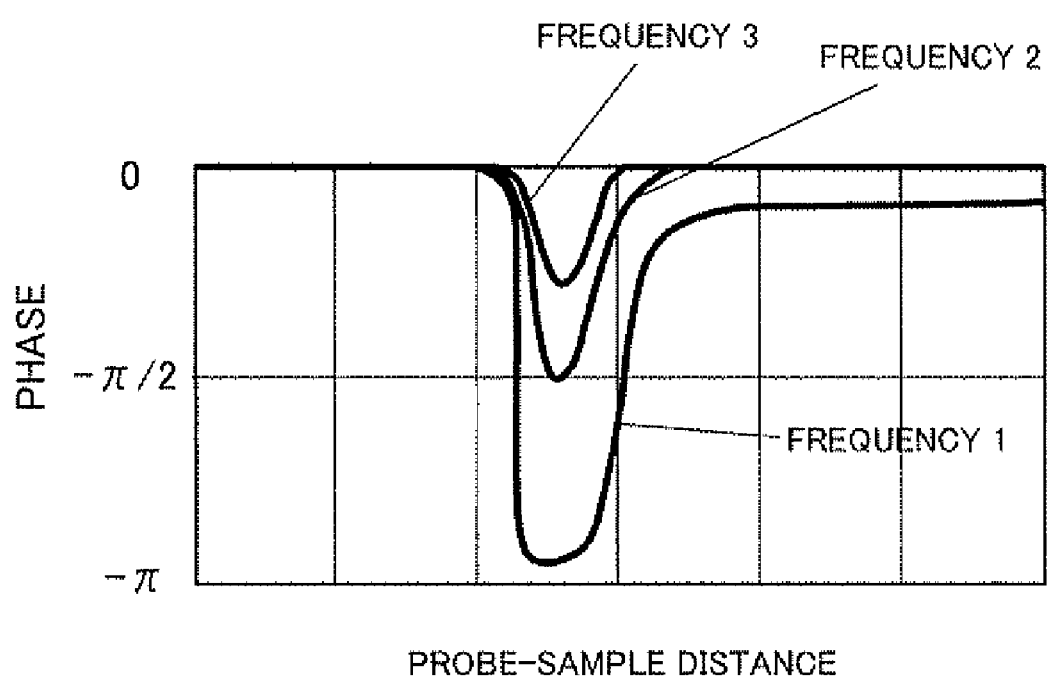
FIG. 15 shows a relationship between the probe-sample distance and a phase in the dynamic mode AFM apparatus of the present invention.

FIG. 14 shows a relationship between the probe-sample distance and the resonance frequency in the dynamic mode AFM apparatus of the present invention, and FIG. 15 shows a relationship between the probe-sample distance and the phase in the dynamic mode AFM apparatus of the present invention.

In the sixth embodiment above, the change in the resonance frequency can be detected by using the phase. FIG. 15 shows the phases from a force input for excitation to an output of speed when the cantilever is driven at a fixed frequency (frequencies 1 to 3 in FIG. 14). In this manner, the phase changes as the probe-sample distance changes. Although the graph of the phase is distorted more than that of the resonance frequency, the inclination is oriented in the same direction. Moreover, since the phase becomes minimum as well at the distance where the resonance frequency is minimum, the fluctuation of the resonance frequency can be detected by using the phase.

However, it is better to control a driving frequency to slowly follow the resonance frequency because the amplitude of the cantilever is narrowed when the resonance frequency becomes too apart from the driving frequency, resulting in the undesirable S/N ratio.

It is advantageous to use the phase when a Q value of the cantilever is low. Although the mechanical Q value of the cantilever immersed in water may decrease to 10 or lower, or the cantilever may stop in case of the self-excited vibration, the method of this embodiment adopts the forced vibration so that the cantilever would not stop its vibration. In addition, since the Q value is low, the amplitude would not decrease significantly even when the driving frequency is more or less offset from the resonance frequency.

The present invention allows the elemental identification with atomic resolution by the scanning electron microscopy with similar simplicity to the manner to obtain topography images, composition images, or XPS images. Thereby, it becomes possible to remarkably increase the amount of information of the sample to be obtained by the scanning electron microscopy.

In addition, the present invention is applicable to the vacuum environment as well as gas or liquid environment, and it allows, for example, imaging of dynamic change of the surface of solid matter in liquid while recognizing involved elements with high resolution. Moreover, the present invention can be considered to be innovative that is highly extensible to the field of surface science and surface engineering, as well as nanoengineering, high-resolution bioimaging, and the like.

Moreover, some of the elements which configure the dynamic mode AFM apparatus may be realized in several other ways, and the embodiments described above merely disclose typical examples thereof.

The present invention should not be limited to the embodiments described above, and a number of variations are possible on the basis of the spirit of the present invention. These variations should not be excluded from the scope of the present invention.

According to the present invention, the automatic control system which can automatically obtain the probe-sample distance can be configured, and atoms on the sample surface can be identified at high speed. In particular, the inclination of the resonance frequency against the probe-sample distance can be obtained. Furthermore, the probe-sample distance can be automatically controlled so that the inclination of the resonance frequency against the probe-sample distance becomes zero, to identify the atomic species quickly.

INDUSTRIAL APPLICABILITY

The dynamic mode AFM apparatus of the present invention is applicable in the field of atomic force microscopy, scanning probe microscopy, surface analysis, surface science, surface engineering, nanoengineering, nanoprocessing, high-resolution bioimaging, and the like.

What is claimed is:
1. A dynamic mode AFM apparatus comprising:
   (a) a scanner for performing three-dimensional relative scanning of a cantilever and a sample;
   (b) a means for generating an AC signal of a resonance frequency in a mode with flexural vibration of the cantilever;
   (c) a means for exciting the flexural vibration of the cantilever with the resonance frequency;
   (d) a means for generating an AC signal of a second frequency which is lower than the frequency of the flexural vibration;

(e) a means for modulating a probe-sample distance of the cantilever with the second frequency;
(f) a means for detecting fluctuation of the resonance frequency;
(g) a means for detecting vibration of the cantilever; and
(h) a means for detecting a fluctuation component which is contained in a detected signal by the means for detecting the resonance frequency fluctuation and synchronized with a modulation signal of the probe-sample distance,
(i) wherein an inclination of the resonance frequency against the probe-sample distance is obtained from strength and polarity of the fluctuation component.

2. The dynamic mode AFM apparatus according to claim 1, wherein the probe-sample distance is automatically controlled so that the inclination of the resonance frequency against the probe-sample distance becomes zero.

3. The dynamic mode AFM apparatus according to claim 2, wherein a frequency in a mode with flexural vibration of a lower order is used as the second frequency, that is different from the frequency in the mode with flexural vibration.

4. The dynamic mode AFM apparatus according to claim 3, wherein a self-excited oscillation circuit which oscillates at the resonance frequency in the mode is configured as the means for generating the AC signal of the resonance frequency in the mode with flexural vibration of the cantilever, and frequency detection is used as the means for detecting the fluctuation of the resonance frequency.

5. The dynamic mode AFM apparatus according to claim 3, wherein a self-excited oscillation circuit which oscillates at the resonance frequency in the mode is configured as the means for generating the AC signal of the resonance frequency in the mode with flexural vibration of the cantilever, and phase detection is used as the means for detecting the fluctuation of the resonance frequency.

6. The dynamic mode AFM apparatus according to claim 3, wherein a signal source to generate an AC signal of a frequency that is a constant frequency around the resonance frequency of the mode or that is controlled to slowly follow the resonance frequency of the mode is used as the means for generating the AC signal of the resonance frequency in the mode with flexural vibration of the cantilever, and the means for detecting the fluctuation of the resonance frequency is configured by detecting a phase of displacement or speed of the cantilever against the signal.

7. The dynamic mode AFM apparatus according to claim 2, wherein a self-excited oscillation circuit which oscillates at the resonance frequency in the mode is configured as the means for generating the AC signal of the resonance frequency in the mode with flexural vibration of the cantilever, and frequency detection is used as the means for detecting the fluctuation of the resonance frequency.

8. The dynamic mode AFM apparatus according to claim 2, wherein a self-excited oscillation circuit which oscillates at the resonance frequency in the mode is configured as the means for generating the AC signal of the resonance frequency in the mode with flexural vibration of the cantilever, and phase detection is used as the means for detecting the fluctuation of the resonance frequency.

9. The dynamic mode AFM apparatus according to claim 2, wherein a signal source to generate an AC signal of a frequency that is a constant frequency around the resonance frequency of the mode or that is controlled to slowly follow the resonance frequency of the mode is used as the means for generating the AC signal of the resonance frequency in the mode with flexural vibration of the cantilever, and the means for detecting the fluctuation of the resonance frequency is configured by detecting a phase of displacement or speed of the cantilever against the signal.

10. The dynamic mode AFM apparatus according to claim 1, wherein a frequency in a mode with flexural vibration of a lower order is used as the second frequency, that is different from the frequency in the mode with flexural vibration.

11. The dynamic mode AFM apparatus according to claim 10, wherein a self-excited oscillation circuit which oscillates at the resonance frequency in the mode is configured as the means for generating the AC signal of the resonance frequency in the mode with flexural vibration of the cantilever, and frequency detection is used as the means for detecting the fluctuation of the resonance frequency.

12. The dynamic mode AFM apparatus according to claim 10, wherein a self-excited oscillation circuit which oscillates at the resonance frequency in the mode is configured as the means for generating the AC signal of the resonance frequency in the mode with flexural vibration of the cantilever, and phase detection is used as the means for detecting the fluctuation of the resonance frequency.

13. The dynamic mode AFM apparatus according to claim 10, wherein a signal source to generate an AC signal of a frequency that is a constant frequency around the resonance frequency of the mode or that is controlled to slowly follow the resonance frequency of the mode is used as the means for generating the AC signal of the resonance frequency in the mode with flexural vibration of the cantilever, and the means for detecting the fluctuation of the resonance frequency is configured by detecting a phase of displacement or speed of the cantilever against the signal.

14. The dynamic mode AFM apparatus according to claim 1, wherein a self-excited oscillation circuit which oscillates at the resonance frequency in the mode is configured as the means for generating the AC signal of the resonance frequency in the mode with flexural vibration of the cantilever, and frequency detection is used as the means for detecting the fluctuation of the resonance frequency.

15. The dynamic mode AFM apparatus according to claim 1, wherein a self-excited oscillation circuit which oscillates at the resonance frequency in the mode is configured as the means for generating the AC signal of the resonance frequency in the mode with flexural vibration of the cantilever, and phase detection is used as the means for detecting the fluctuation of the resonance frequency.

16. The dynamic mode AFM apparatus according to claim 1, wherein a signal source to generate an AC signal of a frequency that is a constant frequency around the resonance frequency of the mode or that is controlled to slowly follow the resonance frequency of the mode is used as the means for generating the AC signal of the resonance frequency in the mode with flexural vibration of the cantilever, and the means for detecting the fluctuation of the resonance frequency is configured by detecting a phase of displacement or speed of the cantilever against the signal.

* * * * *